May 21, 1968     P. F. J. LAMAUDIERE     3,383,730
SYNCHRONIZED CONTROL CIRCUIT FOR THE WINDSHIELD-WASHER
PUMP OF A VEHICLE
Filed June 29, 1966

*INVENTOR*
PAUL, FRANCOIS, JOSEPH LAMAUDIERE

BY
Woodhams, Blanchard & Flynn
ATTORNEYS

United States Patent Office 3,383,730
Patented May 21, 1968

3,383,730
SYNCHRONIZED CONTROL CIRCUIT FOR THE
WINDSHIELD-WASHER PUMP OF A VEHICLE
Paul Francois Joseph Lamaudiere, 81 Blvd. Suchet,
Paris, 16eme, France
Filed June 29, 1966, Ser. No. 561,628
Claims priority, application France, July 2, 1965,
23,288, Patent 88,279
7 Claims. (Cl. 15—250.02)

ABSTRACT OF THE DISCLOSURE

A control circuit for the windshield-washer pump of a vehicle whereby liquid supplied thereby is synchronously controlled by the oscillatory movement of the wiper blade drive linkage. The control circuit contains a switch means mounted on one of the oscillatory members of the drive linkage, which switch contains a movable contact member therein whereby the switch alternately opens and closes due to the effects of gravity on the movable contact member as the switch means oscillates. The alternate opening and closing of the switch causes the washer pump to intermittently supply fluid to the windshield in synchronism with the oscillatory movement of the wiper blades.

This invention relates to a synchronized control circuit for the electric or electromagnetic windshield-washer pump of any vehicle which is equipped with windshield wipers of the type comprising a transmission link-rod system between the wiper motor and wiper arms.

The majority of modern vehicles are normally equipped with windshield wipers as well as windshield washers which are designed to discharge a jet of liquid onto the windshield area which is swept by the wipers and consequently to clean said windshield area.

Specifically, windshield washers of this type are known in which the liquid is pressurized by a pump or like electric or electromagnetic unit so that the resulting pressure and flow rate of liquid are substantially higher than those obtained by means of manually operated pumps.

More specifically, windshield washers are known which are actuated by an electromagnetic pump (U.S. Patent No. 3,193,158) which have the great advantage of affording instantaneous response.

However, the control systems which have been made available to users up to the present time both for electric and electromagnetic washer-pumps are subject to a certain number of disadvantages.

In point of fact, such control systems claim the driver's attention at the moment when undivided attention should be given to driving. Furthermore, windshield washers lose much of their effectiveness when they fail to cover the swept surface both at a suitable location and at a suitable moment relatively to the movements performed by the windshield wipers.

The aim of this invention is to overcome the above-noted disadvantages in a simple and effective manner. To this end, the invention is directed to a synchronized control circuit which is essentially characterized in that a contactor having a contact which is adapted to move under the action of gravity is inserted in said control circuit and mounted either on the windshield-wiper link-rod system or on the wiper arms.

As will be apparent, one jet is thus produced by the windshield washer in a predetermined position of the windshield wiper, thereby ensuring perfect synchronization which is made even more effective by virtue of the fact that the washer jet is well directed, which is particularly the case when its discharge nozzles are mounted on the wiper arms themselves.

Although the contactor can consist of a ball-type contact which operates under the action of gravity, the contactor is designed in accordance with a preferred embodiment of the invention in the form of a mercury contact located within an ampoule which is protected by overmolding.

Preferably, the control circuit is connected in parallel with the windshield-wiper motor circuit, and both circuits can be connected to the current supply source by way of a single switch; moreover, the wiper motor circuit can naturally be connected to the current supply source by way of a separate switch.

A clear understanding of the invention will in any case be gained by consideration of the following description, reference being made therein to the accompanying drawings in which two forms of construction are shown by way of example and not in any limiting sense, and in which:

FIGS. 1 and 2 are longitudinal sectional views of a contactor as shown respectively in the closed position and in the open position;

FIG. 3 illustrates a second contactor in the closed position, and

FIG. 4 shows a control circuit which makes use of any one of the above contactors.

The contactor which is illustrated in FIGS. 1 and 2 is essentially constituted by a conductive tube 1 provided with a lug 2 for mounting said tube, for example, on the arm 3 of a windshield wiper. The tube 1 is closed by an insulating plug 4 in which is slidably fitted a contact-stud 5 maintained by a spring 6. A conductive ball 7 is disposed within said tube.

It is apparent that, if the tube 1 on the one hand and the contact-stud 5 on the other hand are connected to two terminals which are inerposed in the control circuit of the windshield washer, such as the electrical conductors 1' and 5', respectively, the contactor ensures the supply of current to the washer in a series of positions such as the position shown in FIG. 1. On the contrary, in positions such as the position shown in FIG. 2, the windshield washer is isolated. A suitable setting of the contactor therefore permits the possibility of selecting the fraction of the windshield-wiper cycle during which the washer is energized.

The contactor in accordance with FIG. 3 operates on the same principle. Said contactor is in fact constituted by a glass ampoule 8 containing mercury as shown at 9 and protected by an overmolding 10 of plastic material on which can be fitted the lug 11 for the purpose of attaching said contactor to the wiper arm 3.

A socket 12 which can be molded in one piece with the element 10 provides a passageway for two conductors 13 and 14 which constitute the terminal pins of the contactor and over which plug sockets 15 and 16 can be engaged.

As can readily be understood, the contacts 13 and 14 are either connected electrically by means of the mercury 9 or isolated, depending on the position of the wiper arm 3.

Referring now to FIG. 4, it can be seen that this figure represents a circuit which is connected between a direct-current source S and the ground (earth) T. This circuit comprises two parallel branches $B_1$ and $B_2$, the windshield wiper motor M being connected into one branch whilst the pump of the windshield washer L is connected into the other branch in series with a contactor C which can be one of the types described above. The two branches $B_1$ and $B_2$ are controlled by a single switch $I_1$, the opening of which interrupts the action of the windshield wiper and windshield washer whereas the closure of said switch actuates both units, the washer being operated in dependence on the contactor. It will be noted that the switch $I_1$ can be equipped with a time-delay device which can be manually adjusted if necessary and by means of which a predetermined number of cycles of combined operation of windshield washer and windshield wiper can be carried out simply by actuating said switch.

The circuit as hereinabove described can be completed by a switch $I_2$ which is placed between the source and the branch $B_1$, thereby permitting the possibility of putting the windshield wiper into surface independently of the windshield washer.

It will in any case be readily apparent that the embodiments of the invention which have just been described have been given solely by way of non-limitative example and that a large number of modifications could accordingly be contemplated without thereby departing either from the scope or the spirit of the invention.

What I claim is:

1. A control circuit for a vehicle windshield washer-wiper system, said system including a drive motor and at least one wiper blade, drive transmission linkage means interconnecting the drive motor and the wiper blade for oscillating same, said linkage means having oscillatable means including a wiper arm supporting the wiper blade thereon, and including washer pump means for supplying liquid to the windshield, the improvement wherein said control circuit comprises circuit means connected to said washer pump means for energizing same, said circuit means including switch means mounted on said oscillatable means for oscillation therewith, said switch means having a movable contact adapted to be alternately moved as said switch means oscillates so as to alternately open and close said switch means in synchronism with the cyclic oscillatory movement of said linkage means.

2. A control circuit as defined in claim 1, wherein said switch means is mounted on said wiper arm for oscillation therewith.

3. A control circuit as defined in claim 1, wherein said switch means comprises a housing mounted on said oscillatable means for oscillation therewith and said movable contact comprises a ball freely movable within said housing between open and closed positions, movement of said ball being controlled by gravity as said housing oscillates.

4. The control circuit as defined in claim 3, wherein the housing of said switch means is mounted on said wiper arm for oscillation therewith.

5. The control circuit as defined in claim 1, wherein said switch means comprises a capsule fixed to said oscillatable means, said capsule having a pair of fixed contacts extending thereinto, said movable contact comprising an electrically conductive liquid contained within said capsule and freely movable therein in response to the effect of gravity, said liquid being adapted to cyclically contact both of said fixed contacts during oscillation of said oscillatable means for energizing the washer pump means.

6. The control circuit as defined in claim 5, wherein said capsule is fixedly connected to said wiper arm for oscillation therewith.

7. The control circuit as defined in claim 1, wherein said control circuit comprises second circuit means connected in parallel with said first-mentioned circuit means, said second circuit means being connected to the drive motor, a current supply source adapted to be interconnected to said first-mentioned circuit means and said second circuit means, second switch means interconnecting said current source to the second circuit means to permit energization only of said second circuit means, and third switch means adapted to interconnect said current source to both said first-mentioned circuit means and said second circuit means to permit energization of both said circuit means.

References Cited

UNITED STATES PATENTS

| 1,393,312 | 10/1921 | Perry | 200—152 |
| 1,537,796 | 5/1925 | Bossard et al. | 200—152 |
| 1,662,381 | 3/1928 | Eynon | 200—61.52 |
| 2,905,962 | 9/1959 | Ziegler | 15—250.02 |
| 3,078,493 | 2/1963 | Ryck et al. | 15—250.02 |
| 3,161,901 | 12/1964 | Kolb et al. | 15—250.02 |
| 3,181,194 | 5/1965 | Daykin et al. | 15—250.02 |

FOREIGN PATENTS

| 915,421 | 7/1954 | Germany. |

CHARLES A. WILLMUTH, *Primary Examiner.*

WALTER SOBIN, *Examiner.*